(12) United States Patent
Alattar et al.

(10) Patent No.: US 7,006,662 B2
(45) Date of Patent: Feb. 28, 2006

(54) REVERSIBLE WATERMARKING USING EXPANSION, RATE CONTROL AND ITERATIVE EMBEDDING

(75) Inventors: Adnan M. Alattar, Tigard, OR (US); John Stach, Tualatin, OR (US); Jun Tian, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 162 days.

(21) Appl. No.: 10/435,517

(22) Filed: May 8, 2003

(65) Prior Publication Data
US 2004/0044893 A1  Mar. 4, 2004

Related U.S. Application Data

(63) Continuation-in-part of application No. 10/319,404, filed on Dec. 12, 2002.

(60) Provisional application No. 60/430,511, filed on Dec. 2, 2002, provisional application No. 60/404,181, filed on Aug. 16, 2002, provisional application No. 60/340,651, filed on Dec. 13, 2001.

(51) Int. Cl.
*G06K 9/00* (2006.01)

(52) U.S. Cl. ..................................... 382/100

(58) Field of Classification Search ................. None
See application file for complete search history.

(56) References Cited

U.S. PATENT DOCUMENTS

| | | | |
|---|---|---|---|
| 4,750,173 A | 6/1988 | Bluthgen | |
| 5,146,457 A | 9/1992 | Veldhuis et al. | |
| 5,646,997 A | 7/1997 | Barton | |
| 5,822,432 A * | 10/1998 | Moskowitz et al. | 380/28 |
| 5,825,892 A * | 10/1998 | Braudaway et al. | 380/51 |
| 5,889,868 A * | 3/1999 | Moskowitz et al. | 713/176 |
| 6,192,138 B1 | 2/2001 | Yamadaji | |
| 6,208,745 B1 * | 3/2001 | Florencio et al. | 382/100 |
| 6,215,421 B1 | 4/2001 | Kondo et al. | |
| 6,278,791 B1 | 8/2001 | Honsinger et al. | |
| 6,456,726 B1 * | 9/2002 | Yu et al. | 382/100 |

(Continued)

FOREIGN PATENT DOCUMENTS

EP  1 220 152  11/2002

(Continued)

OTHER PUBLICATIONS

De Vleeschouwer et al, "Circular interpretation of histogram for reversible watermarking," IEEE Fourth Workshop on Multimedia Signal Processing, pp. 345-350, Oct., 2001.

(Continued)

*Primary Examiner*—Jingge Wu
*Assistant Examiner*—A. Upreti
(74) *Attorney, Agent, or Firm*—Digimarc Corporation

(57) ABSTRACT

Reversible watermarking methods enable auxiliary data to be embedded in data sets, such as images, audio, video and software. The reversible nature of the method enables the original data set to be perfectly restored. Control systems with feedback loops are used to optimize embedding based on distortion or auxiliary data capacity constraints. The watermarking may be applied recursively to embed several layers, where subsequent layers are embedded into a previously watermarked data set. To recover the original data, each layer is extracted and the data restored in reverse order of the embedding. Sets of elements that are expanded to carry auxiliary data in each layer overlap or are interleaved to maximize embedding capacity or quality of the host data.

19 Claims, 4 Drawing Sheets

U.S. PATENT DOCUMENTS

| | | |
|---|---|---|
| 6,490,681 B1 | 12/2002 | Kobayashi et al. |
| 6,523,114 B1 | 2/2003 | Barton |
| 6,546,139 B1 | 4/2003 | Kondo et al. |
| 2001/0021260 A1 | 9/2001 | Chung et al. |
| 2001/0044899 A1 | 11/2001 | Levy |
| 2001/0054146 A1 | 12/2001 | Carro et al. |
| 2002/0027994 A1 | 3/2002 | Katayama et al. |
| 2002/0040433 A1 | 4/2002 | Kondo |
| 2002/0059520 A1 | 5/2002 | Murakami et al. |
| 2002/0080964 A1 | 6/2002 | Stone et al. |
| 2002/0083324 A1 | 6/2002 | Hirai |
| 2002/0114463 A1 | 8/2002 | Pelly et al. |
| 2002/0118859 A1 | 8/2002 | Stone et al. |
| 2002/0124173 A1 | 9/2002 | Stone |
| 2002/0146123 A1 | 10/2002 | Tian |
| 2002/0171853 A1 | 11/2002 | Wu |
| 2002/0199106 A1 | 12/2002 | Hayashi |
| 2003/0053653 A1 | 3/2003 | Rhoads |
| 2003/0081809 A1 | 5/2003 | Fridrich et al. |
| 2003/0149879 A1 | 8/2003 | Tian et al. |
| 2003/0163305 A1 * | 8/2003 | Cheng et al. ............ 704/219 |

FOREIGN PATENT DOCUMENTS

| | | |
|---|---|---|
| WO | 99/17537 | 4/1999 |
| WO | WO 200074371 A1 * | 12/2000 |
| WO | 02/089056 | 7/2002 |

OTHER PUBLICATIONS

De Vleeschouwer et al, "Circular interpretation of bijective transformations in lossless watermarking for media asset management," IEEE Transactions on Multimedia, vol. 5, No. 1, pp. 97-105, Mar., 2003.

Domingo-Ferrer et al, "Invertible spread-spectrum watermarking for image authentication and multilevel access to precision-critical watermarked images," Proc. IEEE Int'l Conf on Information Technology: Coding and Computing, pp. 152-157, Apr., 2002.

Fridrich et al, "Invertible authentication," Proc. SPIE, vol. 4314, pp. 197-208, Jan. 2001.

Fridrich et al, "Invertible authentication watermark for JPEG images," Proc. IEEE Int'l Conf on Information Technology: Coding and Computing, pp. 223-227, Apr., 2001.

Fridrich et al, "Lossless data embedding for all image formats," Proc. SPIE, vol. 4675, pp. 572-583, Jan., 2002.

Goljan et al, "Distortion-free Data Embedding," *4th Information Hiding Workshop*, LNCS vol. 2137, pp. 27-41, Apr., 2001.

Park et al, "Inversible semi-fragile watermarking algorithm distinguishing MPEG-2 compression from malicious manipulation," IEEE International Conference on Consumer Electronics, pp. 18-19, Jun., 2002

Tian, "Wavelet-based reversible watermarking for authentication," Proc. SPIE, vol. 4675, pp. 679-690, Jan., 2002.

Tian, "Wavelet-based image compression and content authentication," Proc. SPIE, vol. 4551, pp. 11-20, Oct. 22, 2001.

Celik et al., "Reversible Data Hiding," Proc. Int. Conv. Image Processing, vol. II, Sep. 2002, pp. 157-160.

Celik, et al, "Losless Generalized-LSB Data Embedding," IEEE Trans. Image Processing, submitted for publication, Jul. 2002, 14 pages.

Fridrich et al., "Lossless Data Embedding—New Paradigm in Digital Watermarking," EURASIP J. Appl. Signal Processing, vol. 2002, No. 2, Feb. 2002, pp. 185-196.

Kalker et al, Capacity Bounds and Constructions for Reversible Data Hiding, Proc. 14th Int. Conf. Digital Signal Processing, vol. 1, Jul. 2003, pp. 71-76.

Tian, "Reversible Watermarking by Difference Expansion," Proc. Workshop on Multimedia and Security, Dec. 2002, pp. 19-22.

Tian, "Reversible Data Embedding Using a Difference Expansion," IEEE Tran. Circuits and Systems for Video Technology, vol. 13, pp. 890-896, Aug. 2003.

* cited by examiner $\mathbf{u}_0 = (u_0, u_1, u_2, u_3)$  $\mathbf{u}_1 = (u_1, u_0, u_2, u_3)$
(a)  (b)

$\mathbf{u}_2 = (u_2, u_0, u_1, u_3)$  $\mathbf{u}_3 = (u_3, u_0, u_1, u_2)$
(c)  (d)

Fig. 4

REVERSIBLE WATERMARKING USING EXPANSION, RATE CONTROL AND ITERATIVE EMBEDDING

RELATED APPLICATION DATA

This application is a continuation in part of U.S. patent application Ser. No. 10/319,404, filed Dec. 12, 2002, which claims the benefit of U.S. applications Ser. No. 60/404,181, filed Aug. 16, 2002, 60/340,651, filed Dec. 13, 2001, and 60/430,511, filed Dec. 2, 2002.

This application is also related to application Ser. No. 10/035,830 filed Oct. 18, 2001, which claims the benefit of provisional applications:

a) 60/247,389, filed Nov. 8, 2000;
b) 60/260,907, filed Jan. 10, 2001;
c) 60/284,594, filed Apr. 17, 2001; and
d) Ser. No. 10/319,380, filed Dec. 13, 2002, which claims the benefit of 60/430,500, filed Dec. 2, 2002.

The above listed applications are hereby incorporated by reference.

TECHNICAL FIELD

The invention relates to digital watermarking.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting, or line/character thickness variations), software, multidimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. Nos. 10/319,404, 09/503,881 and U.S. Pat. No. 6,122,403, which are hereby incorporated by reference.

A particular class of digital watermarking, called reversible watermarking, enables the original host signal to be reconstructed. One example is disclosed in assignee's application Ser. No. 10/319,404, which describes a variety of methods for reversible watermarking of data, including a technique specifically referred to as difference expansion. Reversible watermarking has a number of applications, as illustrated in the patent documents incorporated above. In one application, a reversible watermark is used to verify that content in which it is embedded has not been altered. In particular, if the reversible watermark can be recovered and/or the content verified (e.g., via comparison of a hash of the perfectly restored content and a hash of original content carried in watermark), then the content is deemed authentic. Many proposed techniques focus on high data carrying capacity while maintaining fidelity of the content. Others propose making the watermark robust, and conditionally reversible in the event that the content has not been altered. For some applications, the reversible watermark can be used to degrade fidelity intentionally, and then restore high quality content through reversal of the watermark, assuming the content user has paid for, licensed, or otherwise been granted permission to access the high quality version.

The needs of a particular application vary, including the extent to which content quality is preserved, auxiliary data carrying capacity is maximized, and robustness is maintained.

The invention provides various methods for reversible watermarking and related software and systems. One aspect of the invention is a method for performing reversible watermarking to embed auxiliary data in an original data set. The method reversibly embeds the auxiliary data into the original data set by expanding values in the original data set that distorts the values, yet enables the values to be perfectly re-constructed. The method applies rate control to determine how to expand the values to minimize distortion for a desired auxiliary data carrying capacity or to maximize data carrying capacity for a desired distortion.

In another variation, the method applies a perceptual model to determine how to expand the values to minimize distortion for a desired auxiliary data carrying capacity or to maximize data carrying capacity for a desired perceptual distortion. This perceptual model may be used in conjunction with a control system with feedback to optimize the embedding based on quality and/or data capacity constraints.

Another aspect of the invention is a method for performing reversible watermarking to embed auxiliary data in an original data set. The method selects sets of elements in the original data set for expansion. It reversibly embeds the auxiliary data into the original data set by expanding values associated with the selected sets in a manner that distorts the values, yet enables the values to be perfectly re-constructed. The reversible watermarking is performed iteratively in layers, and for the layers, interleaving sets of elements are selected for expansion in successive layers.

Further features will become apparent with reference to the following detailed description and accompanying drawings.

BRIEF DESCRIPTION OF THE DRAWINGS

FIG. 4 is a diagram illustrating an example of a permutation used for reversible watermark embedding.

DETAILED DESCRIPTION

1. Introduction

In this document, we describe a method for reversible watermarking and related applications. While the method is described for still images, it may be applied to other data sets, including audio, video, graphical models, text, and software (e.g., object code).

A reversible watermarking system includes an embedder and a reader. The embedder modifies the host data set to embed auxiliary data. In some applications, there is a desire to maintain some level of perceptual quality (e.g., embedding auxiliary data, yet making the resulting images or audio with embedded data look or sound substantially the same as the original image or audio). In this case, controls can be applied to ensure that a desired level of quality is maintained while maximizing the auxiliary data capacity, or maximizing the quality for a particular amount of auxiliary data. The reader analyzes a data set suspected of carrying embedded auxiliary data, extracts the auxiliary data, and restores the data set to its original values prior to embedding.

The method described below performs an expansion of values in a data set to embed auxiliary data. In the specific example provided for images, the method performs an invertible transform to convert the input data into a set that includes expandable data values. This transform is not necessary if the input data set is already in a form that includes sufficiently expandable data values to carry the desired amount of auxiliary data. In general, the transform attempts to create a set of values that maintains the perceptual quality of the host (for data sets where perceptual quality is important) and provides expandable values. One way to accomplish this is to exploit redundancy or correlation among values in the host signal by expanding the difference values between redundant or closely correlated values. One particular way to expand the difference values is detailed further below.

2. Generalized Difference Expansion

Figure 1:
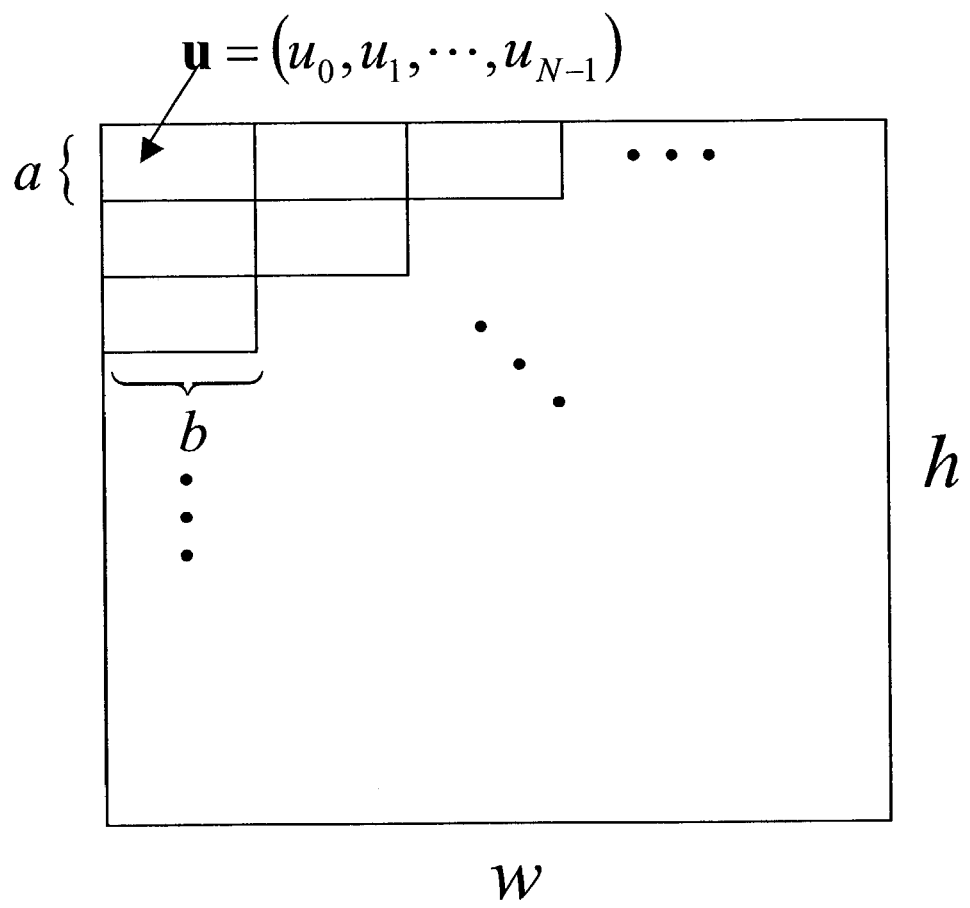
FIG. 1 illustrates an example of how to configure vectors for reversible watermarking.

Vector: For the purpose of this example, the vector $u=(u_0, u_1, \ldots, u_{N-1})$ is formed from N pixel values chosen from N different locations within the same color component for an image according to a predetermined order. This order may serve as a security key. The simplest way to form this vector is to consider every a×b adjacent pixel values as shown in FIG. 1 as a vector. If w and h are the height and the width of the host image, then $1<a<h$, $1<b<w$ and $a+b \neq 2$.

For simplicity, we treat each color component independently, and, hence, each component has its own set of vectors. Also, we select vectors that do not overlap each other; i.e., each pixel exists in only one vector. These requirements may be removed at the expense of complicating the watermarking algorithm due to the extra caution required to determine the processing order of the overlapped vectors.

Forward Reversible Integer Transform: The forward reversible integer transform, $f(.)$, for the vector $u=(u_0, u_1, \ldots, u_{N-1})$ is defined as:

$$v_0 = \left\lfloor \frac{u_0 + u_1 + \cdots + u_{N-1}}{N} \right\rfloor \quad (1)$$
$$v_1 = u_1 - u_0$$
$$\vdots$$
$$v_{N-1} = u_{N-1} - u_0$$

where $\lfloor . \rfloor$ is the least nearest integer.

The inverse transform, $f^{-1}(.)$, for the transformed vector, $v=(v_0, v_1, \ldots, v_{N-1})$ is defined as:

$$u_0 = v_0 - \left\lfloor \frac{v_1 + v_2 + \cdots + v_{N-1}}{N} \right\rfloor \quad (2)$$
$$u_1 = v_1 + u_0$$
$$\vdots$$
$$u_{N-1} = v_{N-1} + u_0$$

Proof: To prove that equation (2) is the inverse of equation (1) one can substitute $v_0, v_1, \ldots, v_{N-1}$ from equation (1) into $u_0$ of equation (2). This gives:

$$u_0 = \left\lfloor \frac{u_0 + u_1 + \cdots + u_{N-1}}{N} \right\rfloor - \quad (3)$$

$$\left\lfloor \frac{(u_1 - u_0) + (u_2 - u_0) + \cdots + (u_{N-1} - u_0)}{N} \right\rfloor$$

$$= \left\lfloor \frac{u_0 + u_1 + \cdots + u_{N-1}}{N} \right\rfloor - \left\lfloor \frac{u_0 + u_1 + \cdots + u_{N-1}}{N} - u_0 \right\rfloor$$

$$= \left\lfloor \frac{u_0 + u_1 + \cdots + u_{N-1}}{N} \right\rfloor - \left\lfloor \frac{u_0 + u_1 + \cdots + u_{N-1}}{N} \right\rfloor + u_0$$

$$= u_0$$

Now, the reversibility concerning $u_1, u_2, \ldots, u_{N-1}$ can be proven by simple mathematical manipulation of $v_1, v_2, \ldots, v_{N-1}$ in equation (1).

Definition 1: The vector $u=(u_0, u_1, \ldots, u_{N-1})$ is said to be expandable if for all values of $b_1, b_2, \ldots, b_{N-1} \in \{0,1\}$ $$0 \leq v_0 - \left\lfloor \frac{\tilde{v}_1 + \tilde{v}_2 + \cdots + \tilde{v}_{N-1}}{N} \right\rfloor \leq 255 \quad (4)$$

$$0 \leq \tilde{v}_1 + v_0 - \left\lfloor \frac{\tilde{v}_1 + \tilde{v}_2 + \cdots + \tilde{v}_{N-1}}{N} \right\rfloor \leq 255$$

$$\vdots$$

$$0 \leq \tilde{v}_{N-1} + v_0 - \left\lfloor \frac{\tilde{v}_1 + \tilde{v}_2 + \cdots + \tilde{v}_{N-1}}{N} \right\rfloor \leq 255$$

where:

$$v_0 = \left\lfloor \frac{u_0 + u_1 + \cdots + u_{N-1}}{N} \right\rfloor \quad (5)$$
$$\tilde{v}_1 = 2 \times v_1 + b_1$$
$$\vdots$$
$$\tilde{v}_{N-1} = 2 \times v_{N-1} + b_{N-1}$$

Notice that each of $\tilde{v}_1, \tilde{v}_2, \ldots, \tilde{v}_{N-1}$ is one-bit left shifted version of the original value $v_1, v_2, \ldots, v_{N-1}$ respectively, but potentially with a different LSB (least significant bit). The conditions of equation (4), above, ensures that changing the LSBs of $v_1, v_2, \ldots, v_{N-1}$ according to equation (5) does not introduce an overflow or underflow in the values of $\tilde{u}_0, \tilde{u}_1, \ldots, \tilde{u}_{N-1}$ when the inverse transform is computed.

Definition 2: The vector $u=(u_0, u_1, \ldots, u_{N-1})$ is said to be changeable if, for all values of $b_1, b_2, \ldots, b_{N-1} \in \{0,1\}$, $\tilde{v}_1, \tilde{v}_2, \ldots, \tilde{v}_{N-1}$ $v_{N-1}$ given by equation (6), below, satisfy equation (4).

$$v_0 = \left\lfloor \frac{u_0 + u_1 + \cdots + u_{N-1}}{N} \right\rfloor \quad (6)$$

$$\tilde{v}_1 = 2 \times \left\lfloor \frac{v_1}{2} \right\rfloor + b_1$$

$$\vdots$$

$$\tilde{v}_{N-1} = 2 \times \left\lfloor \frac{v_{N-1}}{2} \right\rfloor + b_{N-1}$$

Notice that $\tilde{v}_1, \tilde{v}_2, \ldots, \tilde{v}_{N-1}$ in the above equation are the same as the original $v_1, v_2, \ldots, v_{N-1}$ but with different LSBs. Also, notice that a changeable vector remains changeable even after changing the LSBs of its $v_1, v_2, \ldots, v_{N-1}$. Also, from definitions 1 and 2, it can be observed that an expandable vector is also changeable.

This approach can be extended to embed an auxiliary data value with multiple states by shifting or multiplying the difference value by more than one bit position or a number greater than 2, respectively, as discussed in the patent documents incorporated above. Further, it can be extended to values other than difference values, and data types other than images.

2.1 Another Integer Transform

In this section, we describe an integer-to-integer vector transform based on averages and differences that is unique and exactly reversible for any integer vector. The transform is computed through the use of matrix operations including an inverse, and the floor and ceiling functions that round down or up to the nearest integer respectively. We show that even though the floor and ceiling functions introduce a non-linearity, when used in conjunction, they provide uniqueness and reversibility. Although there are many other matrix structures that can form a basis for integer transforms, we will focus here on the matrix structure that implements a difference expansion method.

Let D be a matrix that operates on an integer vector with the following 3 properties; (1) the matrix D is full rank, and the matrix-vector product results in (2) an average value of the integer vector, and (3) N–1 independent differences between vector elements. A weighted average where the weights sum to 1 is equally valid but will not be addressed in this document. For example, if N=4 and we reference all differences to the same (first) integer element, then one possible D is given by $$D = \begin{bmatrix} \frac{1}{N} & \frac{1}{N} & \frac{1}{N} & \frac{1}{N} \\ -1 & 1 & 0 & 0 \\ -1 & 0 & 1 & 0 \\ -1 & 0 & 0 & 1 \end{bmatrix}.$$

Note that to satisfy the full rank and N–1 difference properties, (1) there are exactly one (–1,1) pair in each row, and (2) each element of the integer vector is used to compute at least one difference.

The structure of the first column of $D^{-1}$ can now be completely determined by noting that $DD^{-1}=I$, the identity matrix. In this particular case, the first column of the identity matrix, i.e., a 1 followed by N–1 zeros, must be satisfied when D operates on the first column of $D^{-1}$. The inner product of the first row of D and the first column of $D^{-1}$ must be 1, and the inner product of each of the N–1 difference rows of D and the first column of $D^{-1}$ must generate a zero. Therefore, each element of the first column of $D^{-1}$ must be identical (to satisfy the element differences equal to zero) and the first column of $D^{-1}$ must be a column of 1's (to satisfy the inner product of the first row of D and the first column of $D^{-1}$ equal 1).

Next, let p be a vector of integer pixel values. Then the matrix-vector product, $D_p$, results in a vector that consists of the average, $\langle p \rangle$, and N–1 integer differences. If we now examine the product, $D^{-1}D_p$, we can establish the identity for any given $p_i$ as $p_i=\langle p \rangle+(p_i-\langle p \rangle)$, where the first $\langle p \rangle$ comes from the first column of $D^{-1}$, and the bracketed expression comes from the remaining columns of $D^{-1}$.

Next, if we now apply the floor function (i.e., round down to nearest integer) to $D_p$ to force integers, we get $D^{-1}\lfloor D_p \rfloor$, where $\lfloor . \rfloor$ indicates the floor function. The identity for $p_i$ now becomes: $p_i=\lfloor \langle p \rangle \rfloor+(p_i-\langle p \rangle)=p_i+(\lfloor \langle p \rangle \rfloor-\langle p \rangle)$, where $-1 > (\lfloor \langle p \rangle \rfloor-\langle p \rangle) \leq 0$. Therefore, for any vector p, we get the identity $p=\lceil D^{-1}\lfloor D_p \rfloor \rceil$, where $\lceil . \rceil$ indicates the ceiling function (i.e. round up to nearest integer). In sum, this difference expansion transform, and its inverse, provide a more general form of equations 1 and 2, and can be used in place of equations 1 and 2 in implementations of a reversible watermarking method.

As discussed in prior patent documents incorporated above, there are other possible reversible integer to integer transforms that may be used to produce a set of expandable values for carrying embedded data. In addition, the embedder may apply a series of reversible integer to integer transforms to the host data to produce a set of expandable values. The transforms applied in series may be recursive in the sense that a reversible transform is applied to the output of the previous iteration. In this case, the set of values produced by the last iteration of the transform is modified to embed auxiliary data, and then the transforms are reversed on the modified data in the reverse order of which they were applied. The transforms may also be many to one in the sense that the transform takes as input a vector of length N, and produces a set of potentially expandable values of N–1 or less.

To illustrate these options, consider the example where the generalized transform described in this section is applied recursively to the difference values, such that with each iteration, the absolute value of the difference values from the previous iteration are input to the next iteration of the reversible integer to integer transform. At the end of this series of transforms, the embedder has a set of potentially expandable values. The expandable values, x, are then modified (e.g., 2x +b, where b is an auxiliary data bit) to carry bits from an auxiliary bit stream.

This particular approach has a number of potential advantages. First, the changes made to embed data in the output of the series of transforms translates into smaller changes to the original elements of the host data set. As such, in the case of images for example, the perceptual distortion is lower. This approach provides a way to distribute the error associated with embedding auxiliary data over a wider number of host data elements than might be achieved by applying only one iteration of the integer to integer transform. Thus, if an implementer wishes to optimize perceptual quality vs. auxiliary data capacity, the reversible integer to integer transform can be applied repeatedly to generate a smaller set of expandable values. This approach also enables the embedder to produce a set of expandable values through extra iterations of a reversible transform, where one or fewer iterations of the transform yield no or an insufficient number of expandable values.

3. Example Method for Reversible Watermark

Let $I(i,j,k)$ be an RGB image, and assume that:

1. the pixel values in the red component, $I(i,j,0)$, are arranged into the set of 1×N vectors $U_R=\{u_l^R, l=1 \ldots L\}$ using the security key $K_R$ 2. the pixel values in the green component, $I(i,j,1)$, are arranged into the set of 1×N vectors $U_G=\{u_n^G, n=1 \ldots N\}$ using the security key $K_G$ 3. the pixel values in the blue component, $I(i,j,2)$, are arranged into the set of 1×N vectors $U_B=\{u_p^B, p=1 \ldots P\}$ using the security key $K_B$.

Although it is not necessary, usually all color components in the image have the same dimensions and are processed using the same difference transform. This makes the number of vectors in the sets $U_R$, $U_G$, and $U_B$ to be the same (i.e., L=N=P). Let also the set $U=\{u_r, r=1 \ldots R\}$ represent any of the above set of vectors $U_R$, $U_G$, and $U_B$, and K represent its associated security key. Also, let $V=\{v_r, r=1 \ldots R\}$ be the transformation of V under the difference expansion transform $f(.)$ (i.e., $V=f(U)$ and $U=f^{-1}(V)$). Also, let $u_r=(u_0, u_1, \ldots, u_{N-1})$ and its difference expansion transform be $v_r=(v_0, v_1, \ldots, v_{N-1})$.

The vectors in U can now be classified into three groups according to the definitions given in Section (2), above. The first group, $S_1$, contains all expandable vectors whose $v_1<T_1$, $v_2<T_2,\ldots,v_{N-1}<T_{-1}$, where $T_1, T_2, \ldots, T_{N-1}$ are predefined thresholds. The second group, $S_2$, contains all changeable vectors that are not in $S_1$. The third group, $S_3$, contains the rest of the vectors (not changeable). Also, let $S_4$ denote all changeable vectors (i.e., $S_4=S_1 \cup S_2$)

Let's now identify the vectors of $S_1$, using a binary location map, M, whose entries are 1s and 0s, where the 1 symbol indicates the $S_1$ vectors, and the 0 symbol indicates $S_2$ or $S_3$ vectors. Depending on how the vectors are formed, the location map can be 1- or 2-dimensional. For example, if vectors are formed from 2×2 adjacent pixels, the location map forms a binary image that has one-half the number of rows and one-half the number of columns as the original image. However, if a random key is used to identify the locations of the entries of each vector, then the location map is a binary stream of ones and zeros. The security key and an indexing table are needed in this case to map the zeros and ones in this stream to the actual locations in the image. Such a table is predefined and assumed to be known to both the embedder and the reader.

3.1. Embedding of Reversible Watermark

The embedding algorithm can be summarized using the following steps:

1. For every $U \in \{U_R, U_G, U_B\}$, do the following:
   a. Form the set of vectors U from the image $I(i,j,k)$ using the security key K.
   b. Calculate V using the difference expansion transform, $f(.)$ (see equation (1)).
   c. Use V, equations (5) and (6), and the conditions in equation (4) to divide U into the sets $S_1$, $S_2$, and $S_3$.
   d. Form the location map, M; then compress it using a lossless compression algorithm, such as JBIG or an arithmetic compression algorithm, to produce sub-bitstream $B_1$. Append a unique identifier, EOS, symbol to $B_1$, to identify its end.
   e. Extract the LSBs of $v_1, v_2, \ldots, v_{N-1}$ of each vector in $S_2$. Concatenate these bits to form sub-bitstream $B_2$.
   f. Assume the watermark to be embedded forms a sub-bitstream $B_3$, and concatenate sub-bitstreams $B_1$, $B_2$, and $B_3$ to form the bitstream B.
   g. Sequence through the member vectors of $S_1$ and $S_2$ as they occur in the image and through the bits of the bit-stream B in their natural order. For $S_1$, expand the vectors as described in equation (5). For $S_2$, expand the vectors as in equation (6). The values of $b_1, b_2, \ldots, b_{N-1}$ are taken sequentially from the bitstream.
   h. Calculate the inverse difference expansion transform of the resulting vectors using $f^{-1}(.)$ (see equation (2)) to produce the watermarked $S_1^w$ and $S_2^w$.
   i. Replace the pixel values in the image, $I(i,j,k)$, with the corresponding values from the watermarked vectors in $S_1^w$ and $S_2^w$ to produce the watermarked image $I^w(i,j,k)$.

It should be noted here that the size of bitstream B must be less than or equal to N−1 times the size of the set $S_4$. To meet this condition, the values of the threshold $T_1, T_2, \ldots, T_{N-1}$ must be properly set. Also, it should be noted that the algorithm is not limited to RGB images. Using the RGB space in the previous discussion was merely for illustration purpose, and using the algorithm with other type of spectral images is straightforward.

3.2. Reading Watermark and Restoring Original Image

To read the watermark and restore the original image, the following steps must be followed:

1. For every $U \in \{U_R, U_G, U_B\}$, do the following:
   a. Form the set of vectors U from the image $I^w(i,j,k)$ using the security key K.
   b. Calculate V using the difference expansion transform, $f(.)$ (see equation (1)).
   c. Use V, equation (6), and the conditions in equation (4) to divide the vectors in T into the two sets $\hat{S}_4$ and $S_3$. $\hat{S}_4$ has the same vectors as $S_4$, which was constructed during embedding, but the values of the entities in each vector may be different. Similarly, $S_3$ is the same set constructed during embedding, since it contains non-changeable vectors.
   d. Extract the LSBs of $\tilde{v}_1, \tilde{v}_2, \ldots, \tilde{v}_{N-1}$ of each vector in $\hat{S}_4$, and concatenate them to form the bitstream B, which is identical to that formed during embedding.
   e. Identify the EOS symbol and extract sub-bitstream $B_1$. Then, decompress $B_1$ to restore the location map M, and, hence, identify the member vectors of the set $S_1$ (expandable vectors). Collect these vectors into set $\hat{S}_1$.
   f. Identify the member vectors of $S_2$. They are the members of $\hat{S}_4$ who are not members of $\hat{S}_1$. Form the set $\hat{S}_2 = \hat{S}_4 - \hat{S}_1$.
   g. Sequence through the member vectors of $\hat{S}_1$ and $\hat{S}_2$ as they occur in the image and through the bits of the bit-stream B in their natural order after discarding the bits of $B_1$. For $\hat{S}_1$, restore the original values of $v_1, v_2, \ldots, v_{N-1}$ as follows:

$$v_1 = \left\lfloor \frac{\tilde{v}_1}{2} \right\rfloor, v_2 = \left\lfloor \frac{\tilde{v}_2}{2} \right\rfloor, \ldots, v_{N-1} = \left\lfloor \frac{\tilde{v}_{N-1}}{2} \right\rfloor \quad (7)$$

For $\hat{S}_2$, restore the original values of $v_1, v_2, \ldots, v_{N-1}$ according to equation (6). The values of $b_1, b_2, \ldots, b_{N-1}$ are taken sequentially from the bitstream.

h. Calculate the inverse difference expansion transform of the resulting vectors using $f^{-1}$ (.) (see equation (2)) to restore the original $S_1$ and $S_2$.

i. Replace the pixel values in the image $I^w(i,j,k)$ with the corresponding values from the restored vectors in $S_1$ and S2 to restore the original image $I(i,j,k)$.

j. Discard all the bits in the bit-stream B, which were used to restore the original image. Form the sub-bitstream $B_3$ from the remaining bits. Read the payload and authenticate the image using the watermark contained in $B_3$. For example, recomputed a hash of the restored image and compare this recomputed hash with a hash stored in the embedded bit-stream.

4. Payload Size

To be able to embed data into the host image, the size of the bitstream B is less than or equal to N−1 times the size of the set $S_4$. This means that $$\|S_1\| + \|S_2\| = \frac{\|B_1\| + \|B_2\| + \|B_3\|}{N-1} \tag{8}$$

where $\|x\|$ indicates number of elements in x. But $\|B_2\|=(N-1)\|S_2\|$; hence, equation (8) can be reduced to $$\|B_3\|=(N-1)\|S_1\|-\|B_1\| \tag{9}$$

For the case where N=2, the bit-stream size is $\|B_3\|=\|S_1\|-\|B_1\|$.

Equation (9), above, indicates that the size of the payload that can be embedded into a given images depends on the number of expandable vectors that can be selected for embedding and on how well their location map can be compressed.

With w×h host image, the algorithm would generate $$\frac{w \times h}{N}$$

vectors. Only a portion, $\alpha$ ($0 \leq \alpha \leq 1$), of these vectors can be selected for embedding; i.e., $$\|S_1\| = \alpha \frac{w \times h}{N}.$$

Also, the algorithm would generate a binary map, M, containing $$\frac{w \times h}{N}$$

bits. This map can be losslessly compressed by a factor $\beta$ ($0 \leq \beta \leq 1$). This means that $$\|B_1\| = B\frac{w \times h}{N}.$$

Ignoring the unchangeable vectors (i.e., assuming $\|S_3\|=0$) and using equation (9), the potential payload size (in bits) becomes, $$\|B_3\| = (N-1)\alpha\frac{w \times h}{N} - \beta\frac{w \times h}{N} \tag{10}$$

$$= \left(\frac{N-1}{N}\alpha - \frac{1}{N}\beta\right) \times w \times h$$

Equation (10), above, indicates that the algorithm is effective when N and the number of selected expandable vectors are reasonably large. In this case, it does not matter if the binary map, M, is difficult to compress (this is because its size is very small). But, when each vector is formed from N consecutive pixels (row- or column-wise) in the image, and N is large, the number of expandable vectors may substantially decrease; consequently, the values of the thresholds $T_1, T_2, \ldots, T_{N-1}$ must be increased to maintain the same number of selected expandable vectors. This causes a decrease in the quality of the embedded image. Such a decrease can be ignored by many applications, since the embedding process is reversible and the original image can be obtained at any time. In this case, the algorithm becomes more suitable for low signal-to-noise ratio (SNR) embedding than for high SNR embedding. To maximize $\|B_1\|$ for high SNR embedding, N must either be kept relatively small or each vector must be formed from adjacent pixels in two-dimensional area in the image. The quad(N=4) structure given in the next section satisfies both requirements simultaneously.

When $$\alpha \leq \frac{\beta}{N-1},$$

the payload size in equation (10) becomes negative. In this case, nothing can be embedded into the image. This scenario is less likely to happen with natural images. Most loss-less compression algorithms can achieve a 2:1 compression ratio $$\frac{1}{2(N-1)}$$

In this case, $\alpha$ must be greater than $$\left(i.e., \beta = \frac{1}{2}\right).$$

to be able to embed a non-zero payload. This is can be easily satisfied when N>2. For the case where N=2, the payload size becomes $$\|B_3\| = \left(\frac{\alpha}{2} - \frac{\beta}{2}\right) \times w \times h \tag{11}$$

Equation (11), above, suggests that the ratio of selected expandable pairs, $\alpha$, has to be much higher than the achievable compression ratio, $\beta$, in order for this case to be effective. Since pairs of pixels are used as vectors, the correlation of the pixels in each pair is expected to be very high in natural images. This makes the pair easier to satisfy smaller thresholds, and, hence, to produce a large portion of selected expandable pairs. One approach is to apply the algorithm row-wise, then column-wise, in order to almost double the amount of data that can be embedded into the host image.

5. Rate Controller

For a given vector size, N, the payload size that can be embedded into an image and the quality of the resulting image is solely determined by the host image itself and by the value of the thresholds used. However, many practical applications embed a fixed-size payload regardless of the nature of the host image. Hence, an automatic data-rate controller is necessary to adjust the value of the thresholds properly and to compensate for the effect of the host image. The iterative feedback system depicted in FIG. 2 can be used for this purpose.

Figure 2:
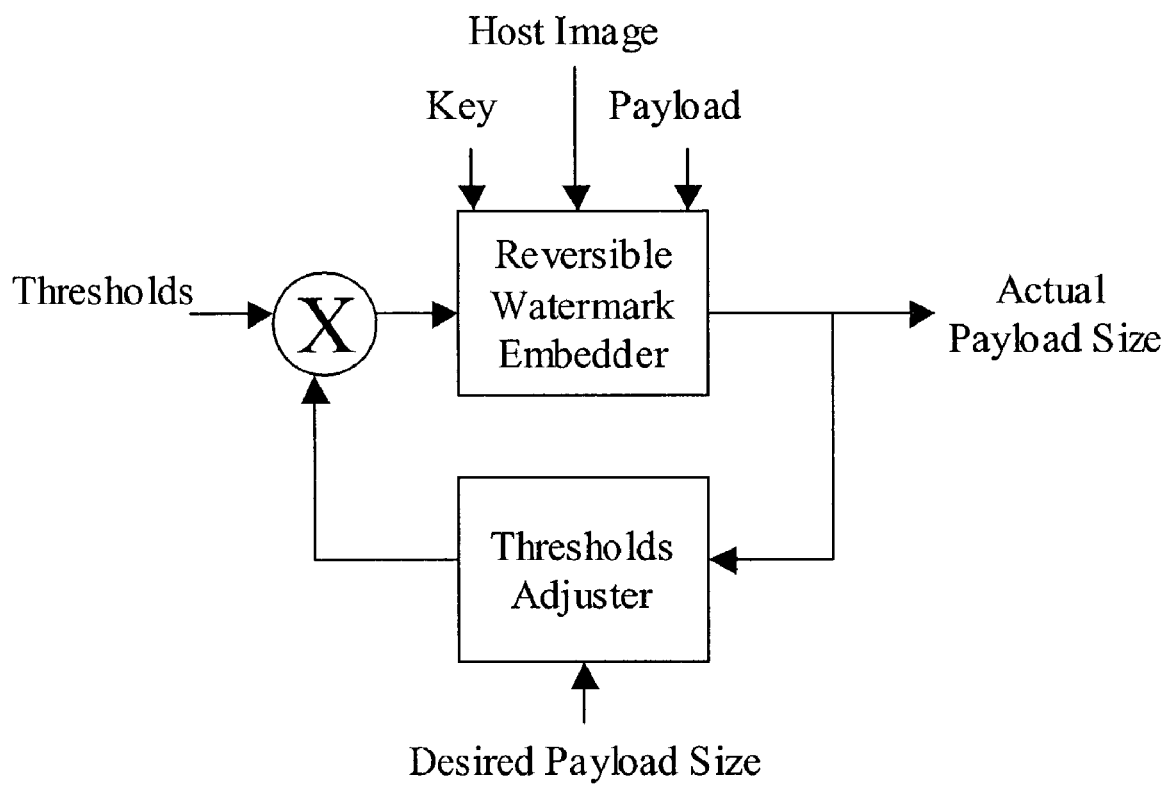
FIG. 2 is a diagram of a rate controller for use in reversible watermarking.

FIG. 2 illustrates a control system with a feedback loop. This system attempts to minimize the distortion to the host signal for a desired payload size. A similar system may be used to maximize the payload size for a desired amount of perceptual distortion. Finally, a system that satisfies both a perceptual distortion constraint can a auxiliary data capacity constraint may be made by constructing a control system that is a function of both constraints.

The control system fits the error signal to a function to modify the thresholds. The error signal may be the difference between the desired payload and the actual payload, or the desired perceptual quality and the actual perceptual quality. The perceptual quality may be measured using a measure of distortion between the original and host signal, including, for example, using human visual system models (e.g., the Watson metric as described in U.S. Pat. No. 5,629,780, a Just Noticeable Difference Metric such as the JNDMetrix™ Technology from Sarnoff Corp. and as described in U.S. Pat. No. 6,360,022, 6,285,797, 5,974,159, 5,719,966 and 5,694,491), or human audibility system models (e.g., models used in audio compression such as MPEG coding AAC) in the case of embedding in audio. The perceptual model can be used to generate a mask that controls the amount of or sets a threshold for changes to values of the host data set. This mask can be computed as a function of the host data set alone, or as a function of the host data set and the host data set with auxiliary data embedded. With each iteration of embedding, the perceptual model can be applied to measure the perceptual quality of the embedded data set relative to a reference data set (such as the previous embedded version or the original host data). At each iteration, the perceptual model can also provide a mask for controlling the amount of changes to the host data set or value representing quality of the embedded data set for use in the control system.

If $T(n)=[T_1(n), T_2(n), \ldots T_{N-1}(n)]$ is the thresholds vector at the $n^{th}$ iteration, and C is the desired payload length, then the following proportional feedback controller can be used:

$$T(n)=T(n-1)-\lambda(C-\|B_3\|)T(n-1) \quad (12)$$

where $0<\lambda<1$ is a constant that controls the speed of convergence. T(0) is a pre-set value that reflects the relative weights between the entities of the vector used in the difference expansion transform.

An alternative feedback controller is:

$$T(n)=T(n-1)-\lambda'(Q-q)T(n-1) \quad (13)$$

Where Q represents the desired quality and q represents the current quality as measured by a perceptual quality metric. $T'(n)=[T_1'(n), T_2'(n), \ldots T_{N-1}'(n)]$ is the thresholds vector at the $n^{th}$ iteration.

There are at least two approaches for introducing a perceptual quality metric into these control system. One approach, for images, is to use the visual quality model to compute a perceptual model threshold map for the host image, and then use a table to map this perceptual model threshold map to the thresholds vector, using the mapped thresholds as a constraint for the threshold vector used in the control system. Another approach is to introduce the perceptual model in $\lambda$ where $\lambda(T, \Delta T, Q_{metric})$.

To combine the payload and perceptual quality constraints, the threshold vectors from equations (12) and (13) can be combined (e.g., through a weighting function that applies a desired preference to capacity or quality) to form a single composite threshold vector.

6. Recursive and Cross-spectral Embedding

Figure 3:
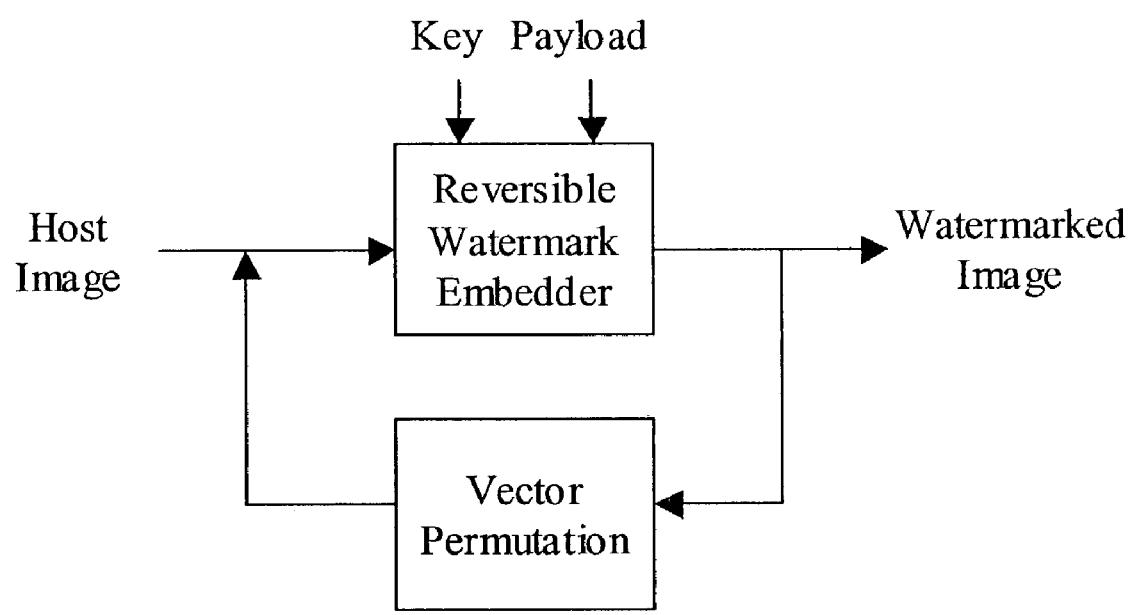
FIG. 3 is a diagram illustrating recursive embedding of a reversible watermark.

Applying the algorithm recursively as in FIG. 3 can increase its hiding capacity. This is possible because the proposed watermark embedding is reversible, which means that the input image can be exactly recovered after embedding. However, the difference between the original image and the embedded images increases with every application of the algorithm. At one point this difference becomes unacceptable for the intended application. Most applications, however, have a high tolerance to this error, since the original image can always be recovered exactly. To reduce the perceptibility of the error introduced by each layer, the embedder is implemented such that it distributes the error more evenly across the host signal to avoid a concentration of error at particular locations, which might become perceptible.

One potential way to distribute the error when the algorithm is applied recursively is to use permutations of the entities of the input vector, which is depicted in FIG. 4. for quad vectors. The figure suggests four difference quad structures, each of which can be used in a different iteration for a total of four iterations. For $u_0$, the difference expansion of equation (1) is performed based on $u_0$, so the closer $u_0$ is to $u_1$, $u_2$, and $u_3$, the smaller the difference is, and, hence, the smaller the embedding error is. Similarly, for $u_1$, $u_2$, and $u_3$, the difference expansion will be based on $u_1$, $u_2$, and $u_3$, respectively. This allows the algorithm to completely exploit the correlation within a quad.

To hide even more data, the algorithm can be applied across spectral components after it is applied independently to each color component. In this case, the vector u contains the color components (R,G,B) of each pixel arranged in a predefined order. This can be done either as cross-spectral triple u=(R,G,B) or as cross-spectral quad u=(R,G,G,B), or permutation thereof. For the cross-spectral quad arrangement, the integer difference expansion transform becomes:

$$v_0 = \left\lfloor \frac{R+2G+B}{4} \right\rfloor \quad (14)$$
$$v_1 = R - G$$
$$v_2 = B - G$$

$$G = v_0 - \left\lfloor \frac{v_1+v_2}{4} \right\rfloor \quad (15)$$
$$R = v_1 + G$$
$$B = v_2 + G$$

which is the reversible component transform proposed in JPEG2000 for color conversion from RGB to YUV.

Although, the spirit of the payload size analysis of section (4) applies to the cross-spectral vectors, the results need some modification. This is because only two bits are embedded per cross-spectral triplet or quad, rather than N−1, and the number of vectors, in this case, equals the area of the location map, which equals the area of the original image. Hence, $$\|B_3\|=2\|S_1\|+\|B_1\|$$

$$\|B_3\|=(2\alpha-\beta)\times w\times h \qquad (16)$$

We implemented the algorithm detailed above and tested it with spatial triplets, spatial quads, cross-color triplets, and cross-color quads with $a_0=a_1=\ldots=a_{N-1}=1$. In all cases, we used a random binary sequence derived from a uniformly distributed noise as a watermark signal. We tested the algorithm with the common 512×512 RGB test images: Lena, Baboon, and Fruits. We set $T_1=T_2=T_3$ in all experiments.

A spatial triplet is a 1×3 or 3×1 vector formed from three consecutive pixel values in the same color component row- or column-wise, respectively. We applied the algorithm recursively to each color component: first to the columns and then to the rows. The achievable embedding capacity depends on the nature of the image itself. Some images can bear more bits with lower distortion in the sense of PSNR than others. Images with a lot of low frequency contents and high correlation, like Lena and Fruits, produce more expandable triplets with lower distortion (in the PSNR sense) than high frequency images, such as Baboon, and, hence, can carry more watermark data at higher PSNR.

In general, the embedded images hardly can be distinguished from the original. However, a sharpening effect can be observed when the original and the embedded images are displayed alternatively. This effect is more noticeable at lower PSNR than at higher PSNR.

A spatial quad was assembled from 2×2 adjacent pixels in the same color component as shown in FIG. 4a. We applied the algorithm to each color component independently. Our experiments indicate that the achievable embedding capacity depends on the nature of the image itself. The algorithm performs with Fruits and Lena much better than Baboon, and it performs slightly better with Fruits than with Lena. With Fruits, the algorithm is able to embed 867 kbits with image quality of 33.59 dB. It is also able to embed 321 kbits with high image quality of 43.58 dB. Nevertheless, with Baboon the algorithm is able to embed 802 kbits at 24.73 dB and 148 kbits at 36.6 dB.

In our experiments, we estimate that the achievable payload size for the spatial quad-based algorithm is about 300,000 bits higher than for the spatial triplets-based algorithm at the same PSNR, and the PSNR is about 5 dB higher for spatial quad-based algorithm than for spatial triplet-based algorithm at the same payload size. Also, the spatial quad-based algorithm has finer control over the payload size and the PSNR than the spatial triplet-based algorithm. For example, it was possible to produce images at PSNRs in the 38 dB to 46 dB range with spatial quad-based algorithm, but not with spatial triplet-based algorithm. This result is because 2×2 spatial quads have higher correlation than 1×3 spatial triplets and because the single location map used by the spatial quad-based algorithm is smaller than each of the two location maps used by the spatial triplet-based algorithm (one location map for each pass).

In general, the quality of the embedded images is better than that obtained by the algorithm using spatial triplets. Also, the sharpening effect is less noticeable.

The cross-color triplets and quads were formed from the RGB values of each pixel, as described above. Our experiments show that the achievable payload size and the PSNR using cross-color vectors are much lower than those using spatial vectors. Hence, for a given PSNR level, we observed that it is better to use spatial vectors than cross-color vectors.

Our results show that the cross-color triplet-based, algorithm has almost the same performance as the cross-color quad-based algorithm with all test images except Lena at PSNR grater than 30. While the cross-color triplet-based algorithm was able to embed small payloads at these higher PSNRs, the cross-color quad-based algorithm was not. Upon closer inspection of the Lena image, we noticed that the blue channel of Lena is very close to the green channel. Also, upon further inspection of the cross-color triplet-based and cross-color quad-based transforms, we noticed that when the red or blue channel is close in value to the green channel, the dynamic range of G after expansion according to equation (5) becomes wider for the cross-color quad-based transform than for the cross-color triplet-based transform. Hence, in this case, the cross-color triplet-based algorithm has the potential of producing more expandable vectors and a location map of less entropy than the cross-color quad-based transform. And, indeed, this was the case with the Lena image.

Interleaving

Another method for iteratively embedding multiple layers into a data set is called interleaving. This method interleaves selected pairings of data values on which to perform difference expansion. Here's an example for iterative embedding of layers into an image:

[1] first layer: reversible watermarking on the horizontal pairing pattern with pixel coordinates (i,2*j−1) and (i,2*j)
[2] second layer: reversible watermarking on the horizontal pairing pattern (i,2*j), (i,2*j+1)
[3] third layer: reversible watermarking on the vertical pairing pattern (2*i−1,j), (2*i,j)
[4] fourth layer: reversible watermarking on the vertical pairing pattern (2*i,j), (2*i+1,j,)

In a prior approach, we performed multi-layer embedding as follows: layer[1] followed by layer[3], then layer[1], layer[3], and so on.

We experimented by comparing results of this and the prior approach on the Lena test image using the scalar difference expansion (pair of two pixels). Starting at about 40 dB, the interleaving approach proposed above gives a higher PSNR than the prior approach. Also the embedding capacity is increased from 2.0 bits/pixel to 2.5 bits/pixel.

This interleaving approach may be used in combination with the other multi-layer approaches discussed above. As detailed above, we have generalized the expansion method to apply to vectors of arbitrary length N. When the reversible watermarking method is applied iteratively to embed two or more layers, the positions of the elements of the vectors selected for each layer can be overlapped and/or interleaved in a variety of ways to obtain a desired embedding capacity and/or quality level.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for pet forming reversible watermarking to embed auxiliary data in an original data set, the method comprising:
reversibly embedding the auxiliary data into the original data set by expanding values in the original data set that distorts the values, yet enables the values to be perfectly re-constructed, wherein the values are represented in a representation capable of representing values in a range from a minimum to a maximum value, and expanding comprises modifying a bit position of at least one of the values in the original dataset to use data carrying capacity of the range for auxiliary data; and
applying rate control to determine how to expand the values to minimize distortion for a desired auxiliary data carrying capacity or to maximize data carrying capacity for a desired distortion.

2. The method of claim 1 wherein the expanding is performed on difference values.

3. The method of claim 1 wherein the expanding includes multiplying the first value by a number and adding auxiliary data to the multiplied value.

4. The method of claim 3 wherein the multiplying and adding are performed so as to avoid an underflow or underflow of the value.

5. The method of claim 1 wherein the rate control includes fitting an error function.

6. The method of claim 1 wherein the race control is applied iteratively using a feedback loop.

7. A computer readable medium on which is stored software for performing the method of claim 1.

8. A method for performing reversible watermarking to embed auxiliary data in an original data set, the method comprising:
reversibly embedding the auxiliary data into the original data set by expanding values in the original data set that distorts the values, yet enables the values to be perfectly re-constructed; and
applying rate control to determine how to expand the values to minimize distortion for a desired auxiliary data carrying capacity or to maximize data carrying capacity for a desired distortion; wherein the auxiliary data is embedded iteratively in layers such that at least some element of the data set carries embedded data from two or more of the layers.

9. A method for performing reversible watermarking to embed auxiliary data in an original data set, the method comprising:
reversibly embedding the auxiliary data into the original data set by expanding values in the original data set that distorts the values, yet enables the values to be perfectly re-constructed; and
applying rate control to determine how to expand the values to minimize distortion for a desired auxiliary data carrying capacity or to maximize data carrying capacity for a desired distortion; wherein the auxiliary data is embedded iteratively in layers, and
wherein each layer expands difference values between pairs of elements, and the pairs of elements for each layer are chosen such that the pairs interleave.

10. A method for performing reversible watermarking to embed auxiliary data in an original data set, the method comprising:
selecting sets of elements in the original data set for expansion; and
reversibly embedding the auxiliary data into the original data set by expanding values associated with the selected sets in a manner that distorts the values, yet enables the values to be perfectly re-constructed;
wherein the reversible watermarking is performed iteratively in layers, and for the layers, interleaving sets of elements are selected for expansion in successive layers, such that at least some element of the data set carries embedded data from two or more of the layers.

11. A method for performing reversible watermarking to embed auxiliary data in an original data set, the method comprising:
selecting sets of elements in the original data set for expansion; and
reversibly embedding the auxiliary data into the original data set by expanding values associated with the selected sets in a manner that distorts the values, yet enables the values to be perfectly re-constructed;
wherein the reversible watermarking is performed iteratively in layers, and for the layers, interleaving sets of elements are selected for expansion in successive layers,
wherein the original data set comprises an image and the interleaving sets of elements includes selecting a pattern of horizontal and vertical pairs across successive layers.

12. The method of claim 10 wherein sets selected for expansion in successive layers overlap according to a pattern, the pattern, is not in the same position in successive layers, and the pattern is selected so as to increase embedding capacity for a desired quality level.

13. A computer readable medium on which is stored software for performing the method of claim 10.

14. A method for performing reversible watermarking to embed auxiliary data in an original data set, the method comprising:
reversibly embedding the auxiliary data into the original data set by expanding values in the original data set that distorts the values, yet enables the values to be perfectly re-constructed; wherein the values are represented in a digital representation capable of representing values in a range from a minimum to a maximum digital value, and expanding comprises modifying a bit position of at least one of the values in the original dataset to use data carrying capacity of the range for auxiliary data; and
applying a perceptual model to determine how to expand the values to minimize distortion for a desired auxiliary data carrying capacity or to maximize data carrying capacity for a desired perceptual distortion.

15. The method of claim 14 wherein the perceptual model used in a feedback control loop.

16. The method of claim 15 wherein the perceptual model is used to control thresholds, which control the expanding of values in the original data set.

17. The method of claim 14 wherein the perceptual model is computed as a function of the host data set and an instance of the host data set embedded with the auxiliary data.

18. The method of claim 17 wherein the perceptual model is applied iteratively for different instances of the host data set embedded with the auxiliary data.

19. A computer readable medium on which is stored software for performing the method of claim 14.

* * * * *